May 12, 1964 E. ANDRE 3,132,552
COPYING DEVICE FOR LATHES AND THE LIKE
Filed July 25, 1960 7 Sheets-Sheet 1

FIG.1

INVENTOR
Edmond Andre

ATTORNEYS

United States Patent Office 3,132,552
Patented May 12, 1964

3,132,552
COPYING DEVICE FOR LATHES AND THE LIKE
Edmond André, Gennevilliers, France, assignor to Victor Salome and Clotaire Salome, Nanterre, France
Filed July 25, 1960, Ser. No. 45,070
Claims priority, application France July 30, 1959
2 Claims. (Cl. 82—14)

There is a well known procedure for copying by means of a lathe which consists of releasing the transverse carriage from its driving screw, the latter being replaced by a device, usually hydraulic in action, which transversely displaces the carriage so that one point thereon follows the outline of a template, while the carriage advances longitudinally at uniform speed.

This device will not serve when the profile to be followed has turns which are too sharp, especially in the case of right angles. To overcome this difficulty the slide on which the transverse carriage travels over longitudinal carriage has been placed at an angle such that when the carriage moves away from the axis of the workpiece there is a longitudinal component of displacement which acts contra to the advancing movement and may, under certain conditions completely offset this advance and thus produce right angle cuts.

However, with such devices, the longitudinal forward speed of the carriage remains constant, or, if it varies, it does so in accordance with a program comprising discontinuous values. Under these conditions, the actual forward speed, measured tangentially of the profile, varies constantly according to the slope of the profile. Consequently, work cannot be carried out under conditions of maximum efficiency.

In order to be able to render the actual forward speed tangential to the profile constant, it is necessary to regulate both the longitudinal and transverse movements of the tool. Conceivably, a feeler bearing on the template might be provided, and this might be capable of being slightly displaced transversely and longitudinally and connected to independently and respectively control the transverse and longitudinal movements of the tool carrying carriage, while an intermediate device regulates their speed in a complementary manner. However, such a device would be extremely complicated.

The object of the present invention is to provide a new article of manufacture which consists of a copying device for lathes or other machines, essentially characterized by the fact that it comprises a transverse carriage which slides perpendicularly to the axis of the lathe on a longitudinal carriage, the two carriages each being driven by control means (hydraulic means for example) while a feeler, driven by the transverse carriage, follows a fixed template, and may move slightly in only one direction, which is inclined with respect to the directions of both the longitudinal and transverse movements of the carriages, but located in a plane substantially parallel thereto. In a first infinitestimal movement toward the outside of the template, this feeler acts on a hydraulic device, for example, which has the effect of progressively reducing the transverse speed, and then stopping the transverse motion, and changing its direction. In a second infinitestimal movement, always in the same direction as the first and slightly greater, this feeler, acting always on the same device, gradually reduces the longitudinal speed, then stops the longitudinal motion, and changes its direction.

In a preferred embodiment of the invention, the feeler is positioned at one end of a rocker, the other end of which acts on a hydraulic device, the pivotal axis of the rocker being positioned in a plane parallel to the directions of longitudinal and transverse movement and at an angle to both directions. Moreover, the hydraulic means has the following characteristics:

(a) In comprises hydraulic control mechanism which permits a correction to be introduced or not introduced at will between the feeler and the hydraulic means on which it acts, thus permitting a first copy (or blank) to be made which carries an extra thickness of material which may then be removed during a second and final copying step.

(b) It comprises one or more successive blank positions in which stops disposed on a cylinder determine the depth of each pass, while the same feeler, travelling over the same template as above, determines the longitudinal strokes by causing the return of the carriages, the same device as in (a) providing for the extra thicknesses on the workpiece.

In order that the invention may be better understood, one embodiment thereof will now be described, purely by way of illustration and example, without in any way limiting the scope of the invention to the specific details thereof as shown on the accompanying drawings, in which.

Figure 1:
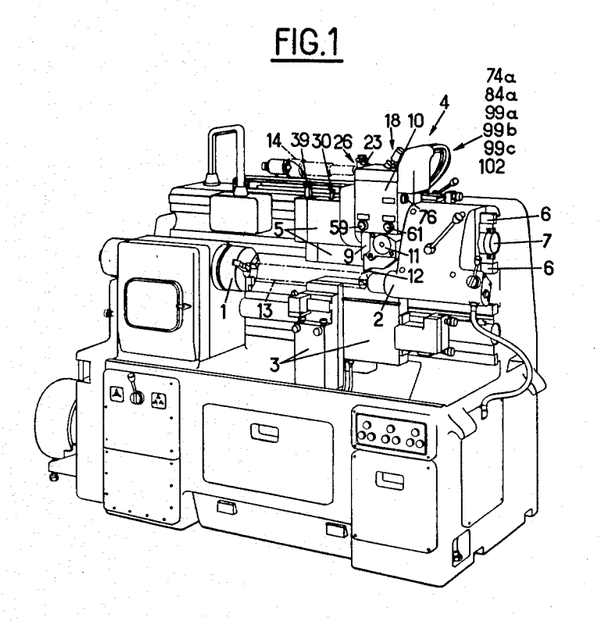
FIG. 1 is a perspective view showing a copying lathe equipped with the invention.

The lathe shown on FIG. 1 comprises in a conventional manner, a fixed headstock provided, for example, with a three-jaw self-centering chuck 1 which drives the workpiece, and a tailstock 2. An assembly of three carriages for use in normal work, without copying, is mounted in the lower part of the machine. The copying device 4 is positioned in its upper part. This copying device comprises a longitudinal carriage 5 which travels on slides 6 and is driven by a hydraulic ram 7, the cylinder of which is fixed, while its piston rod is attached to the carriage 5.

The transverse carriage 9 is slidably mounted on the carriage 5 by means of vertical slides 8 and carries the hydraulic device 10 and the tool holder 11, which in turn carries the tool 12. The workpiece to be machined and the template are represented in dotted lines on FIG. 1 and designated by reference numerals 13 and 14.

Figure 2:
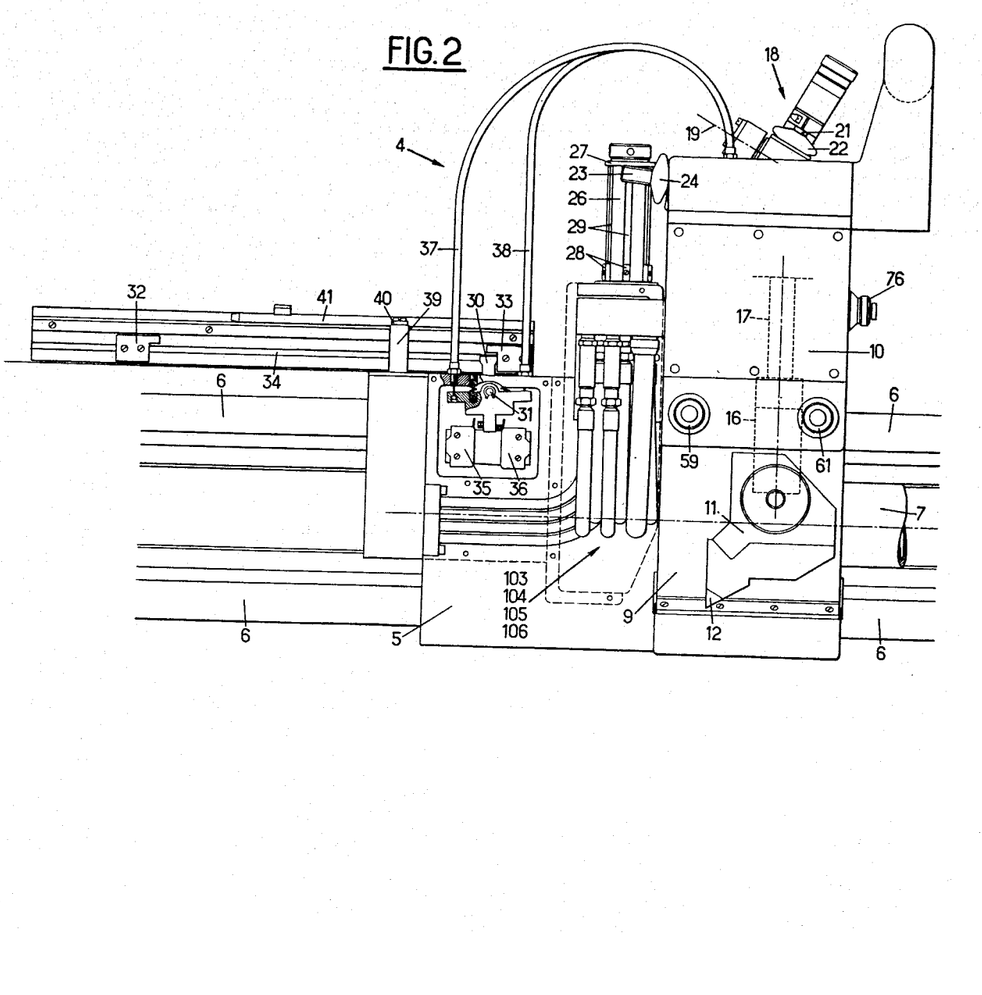
FIG. 2 is an elevational view showing the essential parts of the invention.
Figure 3:
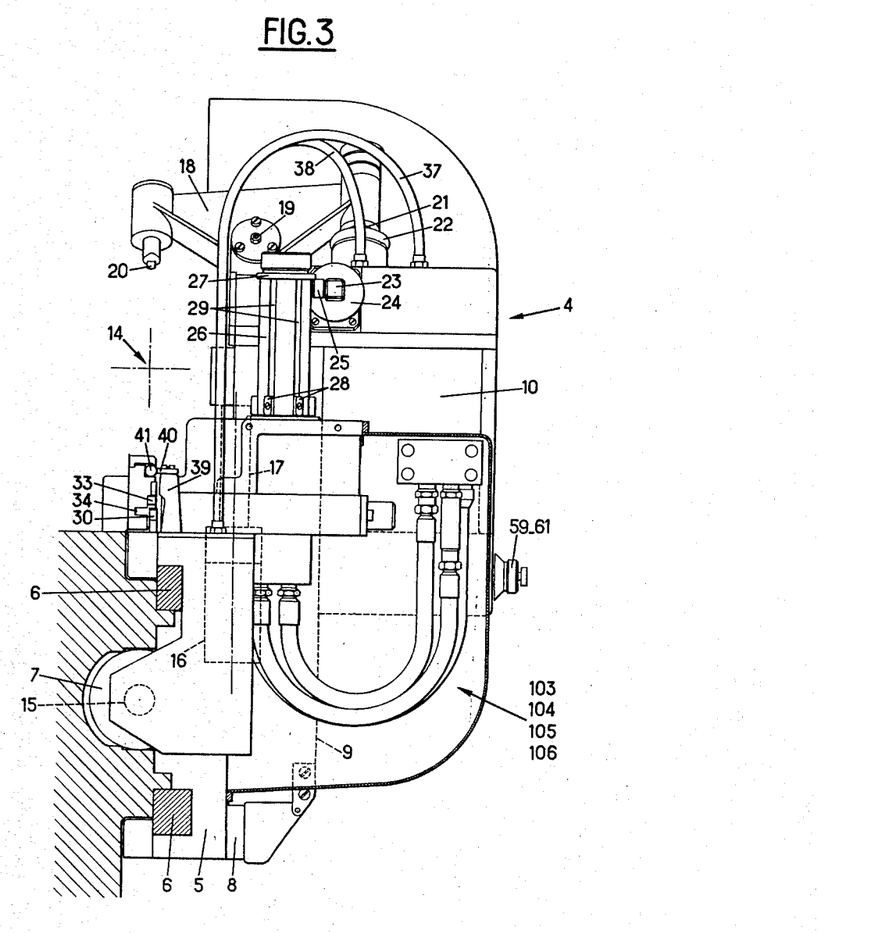
FIG. 3 is an end view taken from the left of FIG. 2.
Figure 3A:
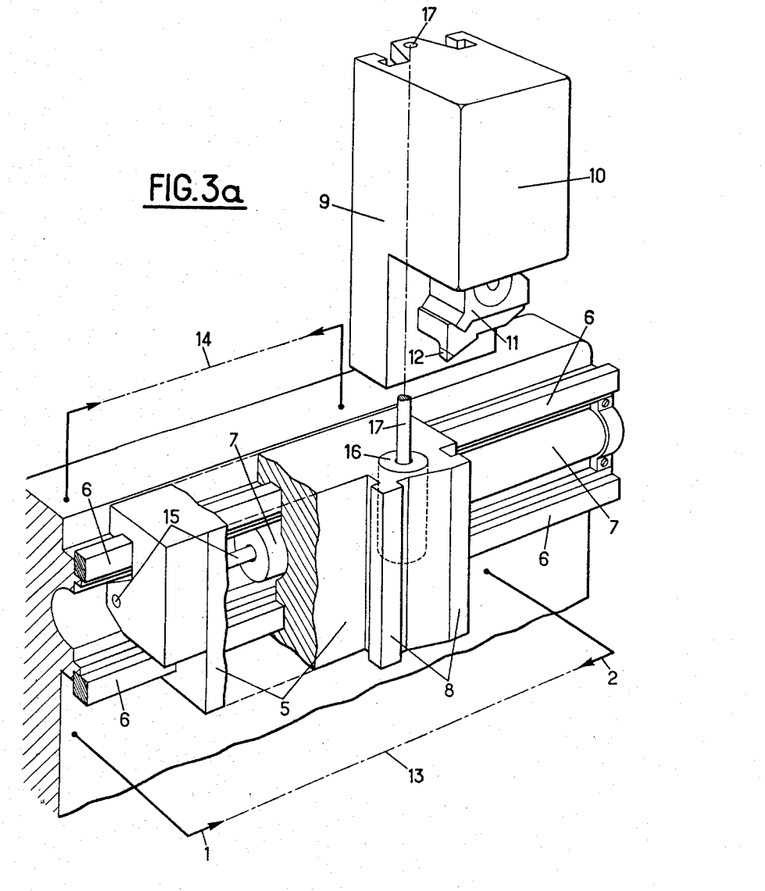
FIGURE 3a is a simplified perspective view showing the longitudinal carriage partially broken away and the transverse carriage displaced toward the top of the figure in alignment with the slide on which it moves.

The copying device 4 itself is shown in detail on FIGS. 2, 3 and 3a. These figures also show the longitudinal carriage 5 and the slides 6 along which they are moved by the hydraulic ram 7. The body (cylinder) of this ram is fixed to the framework of the lathe and its rod 15 to the carriage 5. The transverse carriage 9 runs on the vertical slides 8 and is moved by a hydraulic ram 16, the body of which is fixed to the longitudinal carriage 5 and the rod 17 of which is fixed to the transverse carriage. The two rams 7 and 16 are double acting and supplied through the interiors of the rods, which are hollow and comprise concentric channels opening on opposite faces of the pistons.

The feeler is fixed to the transverse carriage 9, on the upper part of the hydraulic device 10, and comprises a rocker 18 which oscillates about a shaft 19, inclined to the horizontal and located in a vertical plane parallel to the axis of the lathe. This rocker 18 carries at its end a feeler 20 intended to come in contact with the template 14, and carries at its other end a micrometric regulating rod 21, which extends through a hole in the upper wall of the device 10, which is provided with an intermediate rubber grommet for sealing purposes. The end of a lever 23 extends through a rubber grommet 24 in the left side of the device 10. The end of this lever 23 carries a roller 25 which moves along a generatrix of a vertical cylinder 26 fixed to the longitudinal carriage 5. This cylinder carries at its upper end a collar 27, and near its lower end a certain number of adjustable stops 28 which are slidable in 6 longitudinal grooves 29 distributed around the cylinder. This cylinder may be rotated about its vertical axis by means of a mechanism which will be hereinafter described.

The longitudinal carriage 5 also carries a finger 30 pivotally mounted at 31, which is swung by two limit stops 32 and 33 the positions of which may be adjusted along a slide 34. During the movement of the longitudinal carriage 5, when the finger 30 is swung in one direction or the other by one or the other of these limit stops 32 and 33, it acts on two micro-switches 35 and 36, and also on the device 10 through two flexible transmission means (such as Bowden cords) 37 and 38. Finally, the longitudinal carriage also carries a pawl 39 mounted to pivot about an axis parallel to the axis of the lathe and carrying at its top a roller 40. It is actuated during longitudinal movements of the carriage 5 by longitudinal cams 41 which may be mounted on the stationary part of the lathe above the limit stops. These cams act on the roller 40 and the lever 39 actuates hydraulic control means to bring about a rapid longitudinal advance, as will be seen hereinafter.

Figure 4:
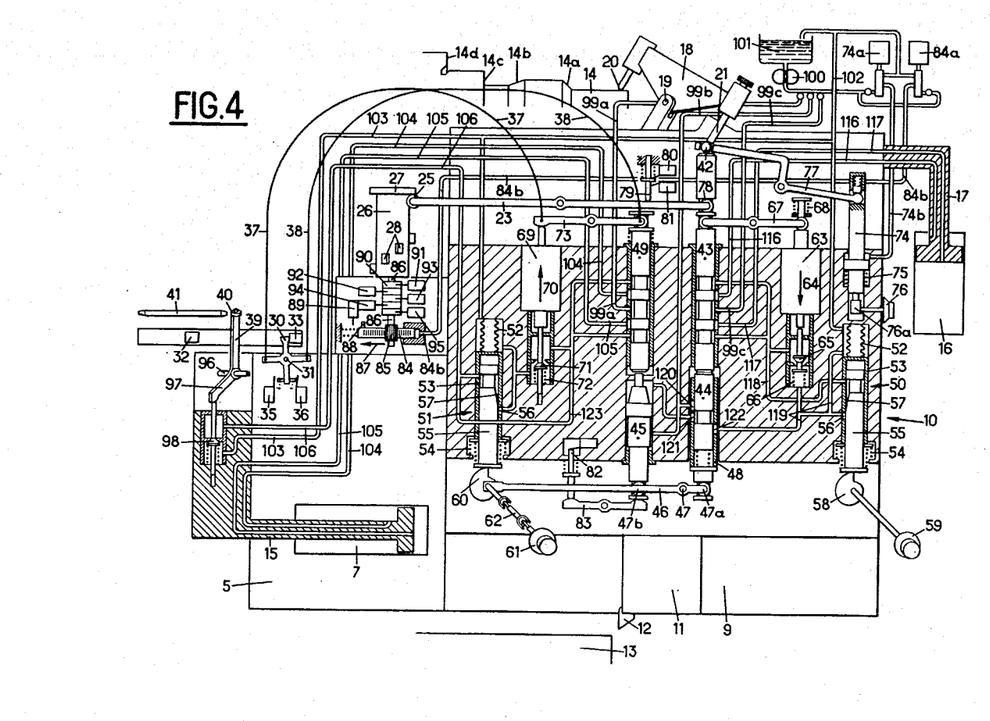
FIG. 4 is a diagram showing the general hydraulic circuit of the device.

The hydraulic device 10 comprises a number of hydraulic and mechanical elements schematically represented on FIG. 4, in which all of these elements are shown in a single plane merely as a matter of convenience. The rod 21 extends through the upper part of the device and transmits the movement of the feeler, acting through a ball 42 on a transverse distributing piston 43 which in turn actuates an auxiliary distributing piston 44 in contact with its end. This auxiliary distributing piston 44 may control a booster piston 45 which acts on a lever 46 pivotally mounted at 47. This lever in turn acts on the sleeve 48 of distributor 44, which sleeve is slidable in the block. On the other hand, the device 10 comprises a longitudinal distribtuor 49 disposed above the booster piston 45.

The device also comprises two thermostatic throttles 50 and 51, each of which comprises expansible members 52, the expansion and contraction of which slide a sleeve 53 biased by the spring 54. A piston 55 travels in this sleeve and progressively obstructs the orifice 56 thereof, by means of an inclined triangular ramp 57 which it carries. The position of the piston 55 of the throttle 50 may be regulated by means of a cam 58 which turns about a fixed axis and is controlled by a control button 59. The position of the piston 55 of the throttle 51, on the contrary, is controlled by analogous cam, the axis of which, instead of being fixed, is displaced by the end of the hereinbefore mentioned lever 46. Moreover, in order to permit this control means to be rotated by a button 61, while also permitting its transverse displacement, the cam 60 and the button 61 are connected by a shaft 62 comprising two universal joints.

Two electromagnets are mounted in the device 10. The one designated by reference numberal 63 has a plunger which is drawn down (in the direction indicated by the arrow 64) when it is energized. When it moves, it closes a valve 65 near its lower end, the valve member of which is biased by a spring 66. At the same time, its upper end swings a lever 67 biased against it by a spring 68. This lever 67 acts on the said transverse distributor 43. The other electromagnet 69 has a plunger drawn toward the top (arrow 70) when it is energized. In this movement it also closes a valve 71 at its lower end, biased by a spring 72, at the same time that its upper part acts through the lever 73 on the longitudinal distributing piston 49. The flexible transmitting means 37 and 38, previously mentioned, are also attached to the two ends of the lever 73.

The device 10 also comprises a small hydraulic cylinder 74, the piston of which is normally biased upwardly into a predetermined position by the spring 75. When oil under pressure is admitted to the upper face of this piston through a duct 74b, it assumes a lower position which may be adjusted by means of a button 76 which acts on the cam 76a. In its movement the piston of the hydraulic cylinder acts on the lever 77, thus slightly displacing the ball 42 in a horizontal direction. When pressure is exerted on this piston, the ball moves back to the right.

Finally the device 10 comprises the lever 23 which has already been mentioned. The end of this lever which extends outside the mechanism carries the roller 25 which bears against the cylinder 26. Its other end 78 acts directly on the transverse ditsributing piston 43. Moreover, this same lever 33 acts on a pushrod 79 controlling two microswitches 80 and 81. Another microswitch 82 is also located near the bottom of the device and controlled by the booster piston 45 through a lever 83.

The entire hydraulic device is, it will be recalled, fixed to the transverse carriage 9 which also carries the tool holder 11, while the cylinder 26 is carried on an axial shaft mounted on the longitudinal carriage 5. The means for rotating the cylinder about its shaft comprises a small hydraulic cylinder 84, the piston rod of which is shaped in the form of a rack, which turns gearing 85. This gearing turns the shaft 86 of the cylinder 26 through a free wheel so positioned that when pressure is applied to the hydraulic cylinder 84, its piston moves in the direction of the arrow 87 and the gearing 85 turns without driving the shaft 86. On the contrary, when the pressure in the hydraulic cylinder is released, the piston is moved in the opposite direction by a spring to which no reference numeral has been assigned, and the gearing then drives the shaft of the cylinder 26 and turns it through a predetermined angle. To simplify the explanation, it will be supposed that the cylinder may be turned to any of six positions and that each return movement of the gearing turns it through one-sixth of a revolution. The piston rod of the hydraulic cylinder 84 carries a pin 88 which acts on a microswitch 89 when the hydraulic cylinder reaches the end of its stroke in the direction of the arrow 87. Finally, the shaft 86 of the cylinder 26 drives a series of 5 cams 90, which act respectively on 5 microswitches designated by reference numerals 91, 92, 93, 94 and 95.

Finally, the longitudinal carriage also carries the previously-mentioned pawl 39, carrying a roller 40 actuated during longitudinal movements of the carriage, by a fixed rectilinear cam 41. This pawl 39 is pivoted about a shaft 96 parallel to the axis of the lathe and carries an additional arm 97 which acts on a valve 98 to open it when the cam bears against the roller.

As indicated in the diagram of the hydraulic circuit (FIG. 4) all the hydraulic means mentioned are connected to each other by means of the ducts shown in the drawing. The device 10 is supplied by three ducts 99a, 99b, and 99c which connect it to three sources of oil supplied by a pump 100 connected to a reservoir 101 and mounted on the framework of the machine, while the duct 102 serves to return the oil which is no longer under pressure to the reservoir 101. Naturally, the four ducts 99a, 99b, 99c and 102 are flexible to permit movement of the device. They are also shown on FIG. 1. In like manner, the ducts 103, 104, 105 and 106, which connect the hydraulic device 10 to the longitudinal carriage, are flexible and shown in FIGS. 2 and 3. Moreover, the small hydraulic cylinders 74 and 84 are likewise connected, respectively, by ducts 74b and 84b to the electrically actuated valves 74a and 84a.

Figure 5:
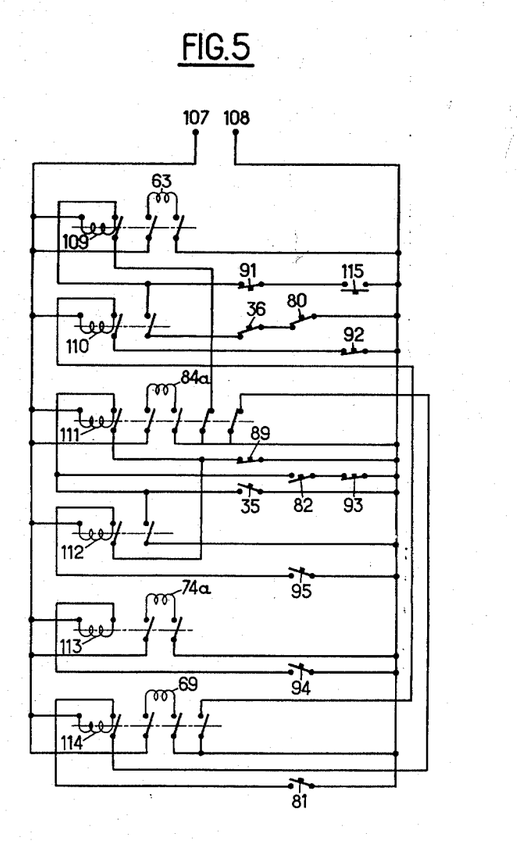
FIG. 5 shows the electrical circuitry of the apparatus.

The electrical diagram of FIG. 5 shows how the various electrical devices are connected to each other. Two supply lines, 107 and 108, supply the electromagnets 63 and 69, as well as the electrically actuated valves 74a and 84a through the microswitches 35, 36, 80, 81, 82, 89, 91, 92, 93, 94 and 95. Moreover, the circuit comprises six relays 109, 110, 111, 112, 113, 114, as well as a cut-off switch 115.

The operation of the copying device will now be considered by examining its reactions to movements of the feeler.

Be it supposed that to begin with the electromagnet 63 is excited, that is to say, that its plunger is drawn downward, closing the valve 65 and compressing the spring 68. If the tip 20 of the feeler is not in contact with the template 14, by reason of the pressure of this spring 68 against the lever 67, the transverse distributing piston 43 moves upward, swinging the arm 18 of the feeler through the ball 42 which acts on the rod 21. The oil under pressure which comes in through 99c is then delivered through the duct 116 which communicates with the upper face of the piston of the hydraulic cylinder 16. This piston then descends, carrying with it the transverse carriage, while the oil compressed by the lower face of the piston flows out through the duct 117 which the distributing piston has placed in communication with the duct 118. The valve 65 being closed, this oil must escape through the thermostatic throttle 50, after which it flows under only atmospheric pressure through duct 119 which rejoins the return duct 102 when it passes by the thermostatic throttle 52. The transverse carriage is thus lowered at a reduced speed, which may be regulated by means of the button 59, but is not affected by the extent of the rise of the distributing piston 43. This speed is also independent of the temperature of the oil, thanks to the thermostatic compensation produced by the expansible element 52. In fact, when the oil heats up, its viscosity diminishes and the flow through the various passages tends to increase the output, but this is avoided by the action of the member 52 which moves the sleeve 53, and thus shifts the orifice 56 therein downward to reduce the effective diameter of the passage entrance and keep the speed of action of the hydraulic cylinder constant.

If it now be supposed that during the downward movement of the transverse carriage 9 and the hydraulic device 10 the tip of the feeler 20 encounters the template 14, the rod 21 pushes the distributing piston 43 downward, acting through the ball 42. This downward movement is arrested when the distributor reaches a position such as that shown in FIG. 4, in which the ducts 116 and 117 are blocked. This blocking position corresponds to an extremely precise position of equilibrium for if the tip of the feeler 20 rises even slightly, so much as a few fractions of a hundredth of a millimeter, this is sufficient to make the distributing piston descend a proportional distance, reconnecting the duct 117 to the inlet 99c and the duct 116 to the outlet 118, which lifts the rod 17 of the hydraulic cylinder 16 and the transverse carriage 9. This upward movement takes place at a speed sufficient to instantly compensate for the slight rise previously mentioned. Similarly, if the feeler descends a short distance, also of the order of fractions of a hundredth of a millimeter, this will connect 116 to the inlet 99c and 117 to the outlet 118 in like manner, so as to instantaneously correct the position of the carriage.

These movements of the feeler 20 also act on the auxiliary distributing piston 44, located in alignment with the distributor 43. As seen on FIG. 4, the oil inlet 99b directly and permanently supplies the lower face of the booster piston 45 and the upper orifice 120 in the sleeve 48 of the auxiliary distributor. This same sleeve is also provided with an orifice 121 which communicates with the upper face of the booster piston 45 and an orifice 122 which communicates with the outlet duct 119 which in turn communicates with the outlet 102. The lever 46, which has been previously mentioned and is pivotally mounted at 47 acts through a roller 47a on the sleeve 48 and is actuated by the booster piston 45 through a roller 47b. In actuality, the ratio between the lengths of the arms of the lever 47—47a and 47—47b is much smaller than shown on FIG. 4. It may easily be of the order of 1–100. If it be supposed that the distributing piston 44 is immobile, the booster piston 45 acts on this lever, as will be hereinafter explained, so that the sleeve 48 moves to a position in which the orifice 121, which communicates with the upper surface of the piston 45, communicates with neither the inlet 120 nor the outlet 122. In actuality, the effective upper section of the piston 45 is larger than its effective lower section, so that equilibrium will not be attained until the pressure in 121 has the same ratio to that in 120 as said sections have to each other. This is possible only because the orifices 120 and 122 are extremely close to the shoulders on the distributing piston 44. If it be supposed that the pressure in 121 is greater than is required, that is to say, approaches the pressure in 120, the piston 45 will immediately descend, thus lifting the sleeve 48 through the lever 46, and the descent of the piston will continue until the orifice 120 is sufficiently blocked by the distributing piston 44 and the outlet 122 begins to function as required. If, on the contrary, the pressure in 121 is lower than necessary for equilibrium, the piston 45 will rise, thus lowering the sleeve 48 until the outlet 122 is closed to the required extent and the inlet 120 sufficiently opened, if necessary, to bring about the desired pressure. If it now be supposed that the distributing piston 44 is mainly stationary, but capable of being slightly displaced, it will readily be seen that for each position of the distributing piston there is an extremely precise position of the booster piston and this position is exactly the one which would be obtained if the sleeve were fixed to the distributing piston 44, and the amplification of movement were produced only by the lever 46, except that the force required to displace 44—48 would be that necessary to displace 45, multiplied by the ratio of the arms of the lever, which is quite large, as has already been pointed out. This booster piston thus multiplies the amplitude of movement of the distributing piston without requiring the exertion of a corresponding additional force.

If the feeler is accidentally displaced:

Let it first be supposed that the feeler 20 is below its normal position. As has been shown, the distributing piston 43 will cause the carriage 9 to descend at a speed which decreases as the feeler approaches its normal position, this speed decreasing to zero exactly when the feeler reaches its normal position (which is defined in this manner). At this moment, the booster piston 45 is at the bottom of its stroke.

Alternatively, let it be supposed that the feeler is artificially raised from its normal position by an infinitesimal amount (several hundredths of a millimeter, for example). As has been seen, this results in upward movement of the carriage 9. At the same time, this movement of some hundredths of a millimeter, when applied to the distributing piston 43, is transmitted to the distributing piston 44, to lift the piston 45 several millimeters, overtaking the play left between the upper part of the piston 45 and the lower part of the longitudinal distributing piston 49. This movement is also transmitted by the lever 46 to the shaft of the cam 60, so as to progressively close the throttle 51, thus progressively reducing the longitudinal speed, if, as has been supposed, the electromagnet 69 is also excited and pushes the longitudinal distributing piston 49 downward, bring the right hand face of the piston of hydraulic cylinder 7 into communication with the pressure inlet 99a through the duct 105, and its left face, through duct 104, into communication with duct 123, on which the throttle acts (when the valves 71 and 98 are closed).

At another time, let it be supposed that the feeler 20 continues to rise several hundredths of a millimeter higher than it should. This movement, transmitted by the distributing piston 43 to the distributing piston 44, causes the piston 45 to continue its amplified upward movement, acting on the longitudinal distributing piston 49 so as to first stop it, and then even change its direction of movement (by connecting 104 to the inlet 99a and 105 to the outlet 123).

The reactions of a device constructed as has been described are those which have been hereinbefore set forth. In accordance with the invention this device permits a constant speed of actual advance, measured tangentially of the profile, and permits the copying of a large variety of contours, especially those having right-angled shoulders and even reentrant angles. Be it supposed, for example, as schematically shown on FIG. 4, that the profile of the template 14 comprises successively a conical rise 14a, a conical descent 14b, a right-angled shoulder 14c which turns upward and a right-angled shoulder 14d with a notch at its base, each of these shapes being connected by cylindrical portions.

During its operation, the feeler 20 occupies the position shown in FIG. 4, the transverse carriage 9 being in equilibrium, and the longitudinal carriage moving forward at a constant speed determined by the throttle 51, the piston 45 being in its lower position.

As has been seen, the tool 12 thus cuts in the workpiece 13 a cylinder corresponding to the cylinder of the template 14.

When the tip of the feeler 20 reaches the base of the conical portion 14a, it rises slightly, and acts immediately on the distributing piston 43 which attains equilibrium in a position such that the speed of ascent of the carriage 9 corresponds exactly to the shape of the cone. This position of the distributing piston 43 is slightly below its normal position as previously defined (the feeler 20 itself is slightly above its normal position). Consequently, the booster piston no longer remains in its lower position, but rises to an extent corresponding to that to which the assembly 43—44 descends, multiplied by the amplifying ratio. This upward movement of the piston acts through the lever 46 on the shaft of the cam 60, thus producing a reduction in the longitudinal forward speed. It will thus be seen that each transverse upward movement of the carriage 9 corresponds continuously to a longitudinal speed of the carriage 5, and this correspondence may be so regulated that the actual forward speed, measured along the profile, is constant, regardless of the slope thereof, which may have any curvilinear form.

If, after having completed the execution of the cylinder following the section 14a, the feeler arrives at the top of the descending conical portion 14b, the feeler tip will, on the contrary, descend, and the distributing piston will take an unbalanced position slightly above its normal position and corresponding to the execution of this cone. This time the booster piston 45 encounters the stop at its lower position. In this case, the correction for the longitudinal speed is not made, this speed remaining constant and equal to the speed set by the throttle 51, thus avoiding the defect of most prior known machines, especially that of the inclined carriage hereinbefore mentioned, in which this speed increases on descending slopes. As a rule, the descending slope which the workman is trying to produce is usually slight and this correction is not necessary. On the other hand, if it is desired to bring about such a correction it may be obtained by increasing the downward stroke of the piston 45 and modifying the mechanism acting on the piston 55.

The tip of the feeler 20, again following along the cylinder, now reaches the bottom of the right-angled shoulder 14c. Thanks to the inclination of the shaft 19, the feeler 20 moves upward and the mechanism acts as has been described, but it will be readily seen that, regardless of the upward speed of the carriage 9, the feeler 20 resting on the plane surface will always continue to move upward until its movement, transmitted by 43—44 and amplified by booster piston 45 acts on the distributor piston 49 until it nullifies the longitudinal speed. Only the transverse movement continues and its speed is controlled by the throttle 50. At the top of the right-angled shoulder the device again cuts a cylindrical section, the descent of the feeler restarting the forward movement.

When the feeler 20 reaches the sharp notch at the base of the shoulder 14d, it first descends in the same manner as on 14b, then after a rectilinear or curvilinear shift, it starts straight up in the same manner as in the case of 14c until it reaches the overhanging part. At this moment the feeler rises again, this movement being transmitted through 43—44, as before, and amplified by the booster piston 45, thus moving the distributing piston 49 upward to change the direction of longitudinal movement to produce the desired effect.

In order to more clearly bring out the advantages of the device constituting the present invention a complete cycle of the lathe, taken by way of example, will now be described, from the introduction of the raw workpiece to its completion.

The raw workpiece having been positioned on the lathe, either manually or by automatic control means, the operator or the mechanism engages the clutch of the drive which turns the lathe and at the same time closes the switch 115, FIG. 5. The lathe then automatically makes, with the device taken as an example, four roughing-out passes, a rough-copying pass, and a final-copying pass. These six passes correspond to the six positions of the cylinder 26.

In order to follow the operation of the complete machine, it is necessary to note the operation of the various switches shown on FIGS. 4 and 5: the switch 35, normally open, is closed when the finger 30 meets the stop 32 at its left; the switch 36, normally open, is closed in like manner when the finger 30 encounters the stop 33 at its right; the contact 80, normally open, is closed when the roller 25 reaches the collar 27 at the top (thus moving the pushbutton 79 upward); the switch 81, normally open, is on the contrary closed when the roller 25 encounters one of the stops 28 (thus moving the push rod 79 downward); the switch 82, normally open when the piston 45 is in its lower position, is closed when the piston 45 rises a certain distance; the switch 89, normally closed, is opened by the pawl 88 when the rod of the hydraulic cylinder 84 reaches the end of its stroke in the direction of the arrow 87.

Figure 6:
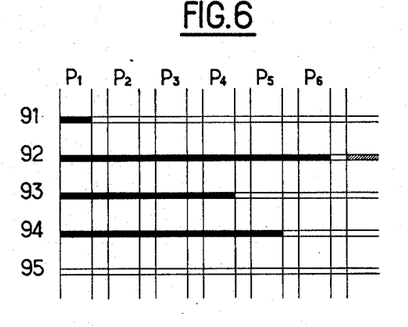
FIGS. 6 and 7 are explanatory diagrams.

The switches 91–95 are controlled, as has been pointed out, by cams 90 turning with the cylinder 26 and the position of the cylinder determines the extent to which they are open or closed. FIG. 6 shows schematically, as a function of the six positions of the cylinder, designated as P1, P2, P3, P4, P5 and P6, the open position of these switches in solid lines and the closed positions by the absence of a line.

If it be supposed that in the beginning the cylinder 26 is in position P1, then the switches 91, 92, 93 and 94 are closed. The brief closing of the contact 115 when the lathe is started up, energizes the relays 109, which close and are kept in closed position by the holding circuit of the relays 111. Thus the electromagnet 63 is excited and, as has already been pointed out, brings down the carriage 9. This descent continues until the roller 25 encounters stop 28 and swings the lever 23 which on the one hand brings the carriage 9 into equilibrium through the action of the roller 78 on the distributing piston 43, and on the other hand, closes contact 81 through the push rod 79. When the switch 81 is closed the relays 114 are energized and remain energized due to the holding circuit of the relays 111. Thus the electromagnet 69 is energized and moves the carriage longitudinally, which executes the plain turning on the diameter given by the stop 28 and corresponding to the first rough pass. At the same time, another contact of the relay 111 energizes the relay 110, which thereafter remains energized by a holding circuit passing through 92, which remains closed. The plain turning continues until the feeler 20 strikes, for example, 14d. At this moment, as has been seen, the booster piston 45 rises a short distance, thus closing the switch 82. This switch supplies the relay 111, which is kept energized by a holding circuit passing through 89. If the tip of the feeler 20 does not touch the profile, the turning continues until the stop 32, striking the finger 30, closes the switch 35, which supplies 111 and produces the same effect. Thus the electrically actuated valve 84a is energized and moves the hydraulic ram 84 in the direction of the arrow 87. At the same time, the holding circuits of relays 109 and 114 are broken, and the armatures of the electromagnets 63 and 69, being therefore no longer excited, return to their rest position, toward which they are biased by the springs 66 and 72 respectively, thus rapidly returning the chariots and opening the valves 65 and 71 by acting on the distributing pistons 43 and 49.

At the end of the stroke of the hydraulic ram 84, the pawl 88 opens the switch 89 breaking the holding circuit of the relay 111 (the switch 82 is then opened by the beginning of the return movement). The electrically controlled valve 84a, being no longer energized, closes and permits the hydraulic ram 84 to move back, thus turning the cylinder to its position P2. The rise of the carriage 9 is balanced when the roller 25 encounters the collar 27, which also closes the switch 80. At the same time the return of the carriage 5 toward the right stops in equilibrium when the finger 30 encounters the limit stop 33 and acts on the distributing piston 49 through the flexible members 37 and 38. Moreover, this same finger 30 closes the switch 36.

Under these conditions the cylinder being in position P2, the switches 92, 93 and 94 remain closed, but the switch 91 opens and the relay 110 remains energized, as has been seen. Thus, since the switches 80 and 36 are both closed, the relay 109 is energized and remains energized as before, due to its holding circuit. The same process begins again, with a new stop 28 and thus a deeper cut, the return stroke being brought about either by the stop 32, or by the contact of the feeler 20 with the shoulder 14d or some other shoulder. At the end of this second rough pass, the cylinder turns again, as before, and when in position P3 brings about a third rough cut, and in position P4 a 4th rough cut, each corresponding to a stop 28, after which it shifts to position P5.

In position P5, as indicated in FIG. 6, the switches 92 and 94 remain closed, but the switch 93 is then open and, moreover, there is no stop 28. The return movement of the carriages actuates the switches 80 and 36, as before, thus energizing the relay 109 which remains energized. The electromagnet 63, being excited, causes the carriage 9 to descend, but this time it is the contact of the feeler 20 on the template 14 which balances the carriage and closes the contact 81. The relay 114 is then energized and remains energized, thus producing the longitudinal displacement, but this time the movements of the feeler do not produce the return movement of the carriages, because the switch 93 is open and prevents the switch 82 from acting. The copying process hereinbefore described is thus carried out.

However, in all the preceding rough passes, as well as in the copying in position P5, the switch 94 remains closed. Consequently the electrically controlled valve maintains pressure in the hydraulic cylinder 74 acting on the ball 42 and the tool 12 remains at a certain distance from the desired profile measured at an angle to the direction of movement of the feeler 20 and determined by the control means 76, thus leaving a slight extra thickness which will be removed during the final copying pass.

The stop 32 having swung the finger 30 and brought about the return of the carriages and the rotation of the cylinder as hereinbefore described, which assumes its P6 position, the switch 94 opens, thus moving the hydraulic ram 74 and the ball 42 to rest position, but the contact 92 remains closed and the relay 110 is always energized. The final copying is always controlled by closing the contacts 36 and 80 (returns) and this time exactly follows the profile, until the stop 32 strikes the finger 30, thus closing the switch 35 and produces the return of the carriages and the rotation of the cylinder 26. At this moment, the switch 92 opens to an intermediate position before closing in position P1, but the relay 110 is returned to rest and the cycle stops. On the other hand, the contact 91 closes, permitting actuation of the switch 115 for a new cycle.

In order to reduce the duration of the cycle, it is possible to so position the cams as to produce a rapid longitudinal advance by the carriage during movements during which the tools are not cutting, in particular during the approach to the work. It is easy to see that these cams 41 act through the roller 40, on the lever 39, which opens a valve member 98 permitting release of the pressure fluid in the hydraulic cylinder 7 without its passing through the throttle 51.

Figure 7:
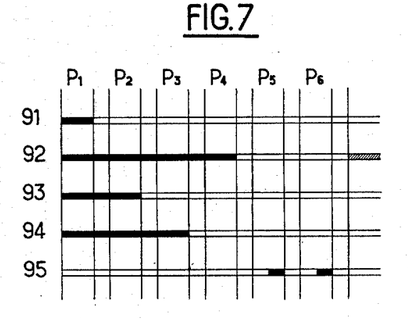

Moreover, it is possible, if desired, to avoid using all six positions of the cylinder 26. If it be supposed, for example that it is desired to make only two roughing passes, followed by a rough copying and a final copying, the cams acting on the switches 92, 93, 94 and 95, are then modified according to the circuit of FIG. 7. The two roughing passes P1, P2, are brought about as before, and the rough copying and final copying are brought about at P3 and P4 (in the same manner as previously at P5, P6). At this moment it is necessary to return the cylinder 26 to the position P1 for the following cycle. The switch 95 then intervenes, closing when the cylinder 26 reaches position P5 (and P6). The last rotation of this cylinder, at the end of the final copying stop, brings it to position P5 and closes at the end of its stroke the switch 95. This energizes the relay 112 which remains energizing by reason of the holding circuit through the switch 89 (which is closed, so that the rotation of the cylinder 26 corresponds to the return of the hydraulic ram 84). But the relay 112 energizes through its other contact the relay 111, which energizes 84a and moves the hydraulic ram in the direction of the arrow 87. At the end of the stroke of the hydraulic ram 84, the switch 89 breaks the circuit of relays 111 and 112 and the cylinder turns from P5 to P6 during the return of the hydraulic ram 84. At the end of the cycle of the cylinder in position P6, the switch 95 again closes and produces in the same way a new rotation of this cylinder which stops in position P1 ready for the next cycle. During all these non-operating movements of the cylinder, the hydraulic device remains stationary because the opening of the switch 92 has de-energized the relay 110. This improvement likewise permits the omission in the cycle of any operations which it is desired to omit, whatever they may be. Of course, the cams 90 are made of elements so inserted as to permit any desired combination of steps to be secured.

Thus, in addition to these advantages which the reproducing device affords for copying, that is to say an actual forward speed which is always optimum attained with a relatively simple and easily controlled device, a lathe so equipped also has the advantage of permitting an automatic cycle with several roughing passes before the rough copying and the final copying, without requiring, as in conventional copying lathes, roughing stops on a large longitudinal cylinder and limiting the length of subsequent passes. In effect, with the device according to the invention it has been seen that the workpiece may be automatically reduced in size without any regulation other than that of the stops controlling the depth of the pass.

It will of course be appreciated that the invention is not limited to the details of the specific embodiment hereinbefore described, but may be modified by substituting equivalent elements without thereby departing from the spirit of the invention.

What we claim is:

1. A copying device for a machine tool, said tool being of the type comprising means for holding a workpiece in position along a horizontal longitudinal axis, means for holding a template parallel to said axis, a longitudinal carriage mounted to move parallel to said axis, variable speed means for driving said longitudinal carriage, and a transverse carriage mounted on said longitudinal carriage for transverse movement relative thereto, said copying device comprising a sensing device mounted on said transverse carriage in position to contact said template, a source of hydraulic pressure, a sump, a first double-acting hydraulic cylinder for actuating said transverse carriage, a slide valve, and a manually adjustable thermostatic throttle, said pressure source being connected to one chamber of said cylinder through said slide valve and said sump being connected to the other chamber of said cylinder through said slide valve and said throttle successively, a second double acting cylinder for actuating said longitudinal carriage, a second slide valve and a second manually adjustable thermostatic throttle, said pressure source being connected to one chamber of said second cylinder through said second slide valve and said sump being connected to the other chamber of said second cylinder through said second slide valve and second throttle successively, means for manually adjusting the position of said second throttle, a first auxiliary valve having a valve member mounted to move with the valve member of said first slide valve, a second auxiliary valve comprising a valve member positioned to actuate the valve member of said second slide valve, a sleeve encircling the valve member of said first auxiliary valve, motion amplifying means connecting said sleeve to the valve member of said second auxiliary valve, and a hydraulic circuit for admitting fluid pressure to said auxiliary valves from said source and relieving it to said sump, said first auxiliary valve being connected into said circuit to control the net pressure applied to the valve means of the second auxiliary valve in such manner as to equalize the pressure on opposite sides thereof only when said sleeve is in a predetermined position relative to the valve member of said first auxiliary valve.

2. A device as claimed in claim 1 comprising an additional manually adjustable hydraulic cylinder, and means operated by said additional cylinder for introducing between said sensing device and the first slide valve a force modifying the response of said first slide valve to movements of said sensing device.

References Cited in the file of this patent

UNITED STATES PATENTS

| | | |
|---|---|---|
| 2,549,971 | Johnson | Apr. 24, 1951 |
| 2,711,113 | Audemar | June 21, 1955 |
| 2,727,419 | Evans | Dec. 20, 1955 |
| 2,819,639 | Grover | Jan. 14, 1958 |
| 2,896,490 | Von Zelewsky | July 28, 1959 |
| 2,957,488 | Farkus | Oct. 25, 1960 |